United States Patent [19]

Liguori

[11] 4,134,199
[45] Jan. 16, 1979

[54] METHOD FOR PRODUCING BALL POINT PEN NIBS

[75] Inventor: Alfred T. Liguori, San Diego, Calif.

[73] Assignee: Modern Mold & Tool Corp., Bronx, N.Y.

[21] Appl. No.: 833,763

[22] Filed: Sep. 16, 1977

[51] Int. Cl.² ............................................. B23P 11/00
[52] U.S. Cl. .................................. 29/441 BP; 29/453; 264/318
[58] Field of Search ........................... 29/453, 441 BP; 425/577, 432, DIG. 8; 264/318, 328, 242

[56] References Cited

U.S. PATENT DOCUMENTS

| | | | |
|---|---|---|---|
| 2,660,151 | 11/1953 | Smith et al. | 264/342 R |
| 2,921,343 | 1/1960 | Mumford | 264/318 X |
| 3,166,618 | 1/1965 | Fehling et al. | 264/242 |
| 3,671,616 | 6/1972 | Nabata et al. | 264/318 X |
| 3,678,565 | 7/1972 | Linz et al. | 29/441 BP |

FOREIGN PATENT DOCUMENTS 1022805  3/1953  France .................. 29/441 BP

*Primary Examiner*—Leon Gilden
*Attorney, Agent, or Firm*—William R. Liberman

[57] ABSTRACT

A ball point nib is produced by injection molding of a resilient or memory possessing thermoplastic resin, the integral nib body member including a ball housing cavity having a circular front opening delineated by an annular lip and communicating by passageways to the rear of the body member. An ink transfer ball of greater diameter than the front opening is passed through the opening into the cavity, temporarily pressure expanding the opening by pressure deforming the lip which returns to its initial state following the passage of the ball. In forming the body member a mold is employed including stationary front and movable rear mold sections having registering first and second mold cavities. An axial first core is axially movable a limited distance in the first mold cavity and has a conical rear face provided with peripherally spaced protuberances and a lip forming undercut at about the plane of the first mold cavity front face when the first core is in its forward position. A second core is carried by the rear mold section coaxial with the second mold cavity and has peripherally spaced longitudinal parallel bars terminating in end faces coinciding with the first core conical face in the mold closed position. A molten resin is injected in the closed mold and solidified, and in opening of the mold the molded body member is first withdrawn from the first mold cavity and then disengaged from the first core.

6 Claims, 11 Drawing Figures

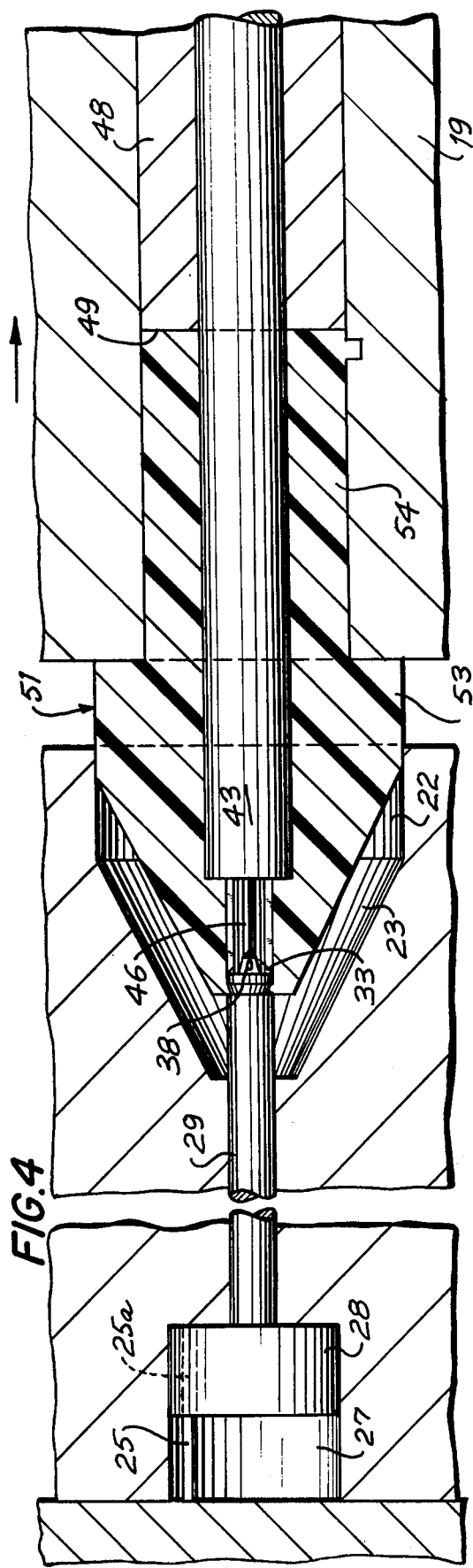
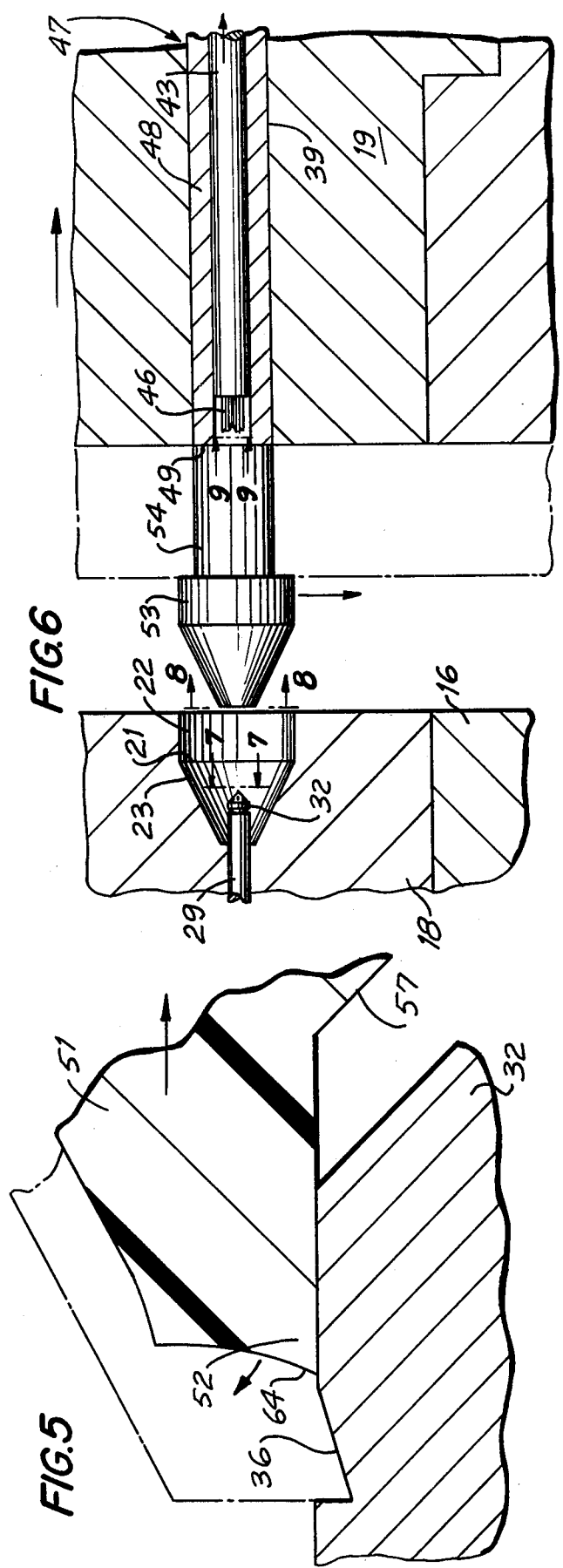

METHOD FOR PRODUCING BALL POINT PEN NIBS

BACKGROUND OF THE INVENTION

The present invention relates generally to improvements in methods and apparatus for the production of writing implements, and it relates particularly to an improved method and apparatus for the production of ball point nibs.

The conventional ball point nib includes a body member having an ink transfer ball housing cavity with a rear ball seat connected by capillary ink passageways through the body member to an ink reservoir and a front opening through which the ink transfer ball, which is rotatable, projects, the ball being retained in the housing cavity by an inwardly projecting annular lip surrounding the front opening and having an inside diameter less than the diameter of the lip. The lip is generally integrally formed of a metal such as brass or other material including synthetic organic polymeric resins. The conventional method of assembling the body member and ink transfer ball is to insert the ball through the enlarged front opening before the forming of the lip into the housing cavity and then upsetting the front of the body member by pressure or heat and pressure to form the inwardly directed ball retaining lip. This procedure of forming the lip following the application of the ball possesses numerous drawbacks and disadvantages. It is highly unreliable and imprecise, results in a high percentage of rejects and poorly operating writing implements of low uniformity, and otherwise leaves much to be desired.

SUMMARY OF THE INVENTION

It is therefore a principal object of the present invention to provide an improved method and apparatus for the production of writing implements.

Another object of the present invention is to provide an improved method and apparatus for the production of ball point nibs.

Still another object of the present invention is to provide an improved method and apparatus for injection molding of a synthetic organic polymeric resin an integral body member of a ball point nib.

A further object of the present invention is to provide an improved method of assembling the body and ink transfer ball in a ball point nib.

Still a further object of the present invention is to provide an improved method and apparatus of the above nature characterized by their reliability, ruggedness, precision and uniformity of production, efficiency, and high versatility and adaptability.

The above and other objects of the present invention will become apparent from a reading of the following description taken in conjunction with the accompanying drawings which illustrate a preferred embodiment thereof.

In a sense the present invention contemplates the provision of an improved method of producing a ball point nib comprising injection molding of a resilient or shape-returning memory possessing thermoplastic synthetic organic polymeric resin, an integral nib body member having a cavity for housing an ink transfer ball and provided with a central front opening surrounded by an inwardly directed temporarily pressure deformable initial shape returnable annular lip, and passageways providing communication between the cavity and the rear of the body member, and pressing an ink transfer ball of a diameter greater than that of the front opening and not exceeding the width of the cavity through the opening into the cavity by expanding the opening under the influence of the ball pressed against the lip to permit the passage of the ball through the ball expanded opening into the cavity, the opening thereafter contracting to its initial dimensions and shape.

The body member is advantageously produced by injecting the molten resin into a mold having front and rear sections with respective registering first and second mold cavities and an axial first core member located in the first mold cavity and having an annular undercut complementing the front opening lip and being axially movable in a limited path between a forward position with the undercut being adjacent to the forward base face of the first mold cavity and a rear position rearwardly thereof, permitting the resin to solidify in the mold cavity, separating the front and rear mold sections first to withdraw the solidified body member from the first mold cavity and retract the first core member to its rear position and further separating the mold sections to withdraw the first core member out of engagement with the molded body member, the front annular lip delineated and formed by the undercut returnably expanding during the withdrawal of the first core member from the solidified body member. In the preferred form of the improved mold, the first core member has a rearwardly directed conical end face with regularly peripherally spaced protuberances. The second mold section includes a second core member affixed thereto and coaxial with the second mold cavity therein and terminating in regularly peripherally spaced longitudinally extending parallel bars terminating in front end faces coinciding with the conical rear end face of the first core member when the mold is in closed condition. The first core member protuberances medially register with respective spaces between successive second core member front bars. The improved mold assembly advantageously contains a plurality of mold pairs which communicate by runners with a sprue on a front plate carrying the front mold sections. The second core member forms ink passageways which communicate with the first core member which forms the ball housing cavity and the ball retaining lip.

The improved method and apparatus are simple and reliable and produce ball point nibs of great uniformity and precision with a minimum of rejects.

BRIEF DESCRIPTION OF THE DRAWINGS

FIG. 4 is a view similar to FIG. 3 with the mold sections shown in a partially parted condition;

FIG. 5 is an enlarged detailed fragmentary longitudinal sectional view showing the stripping of the molded piece from the front mold section core undercut;

FIG. 6 is a view similar to FIG. 2 but with the mold in a fully opened position and the ejector advanced.

DESCRIPTION OF THE PREFERRED EMBODIMENT

Figure 2:
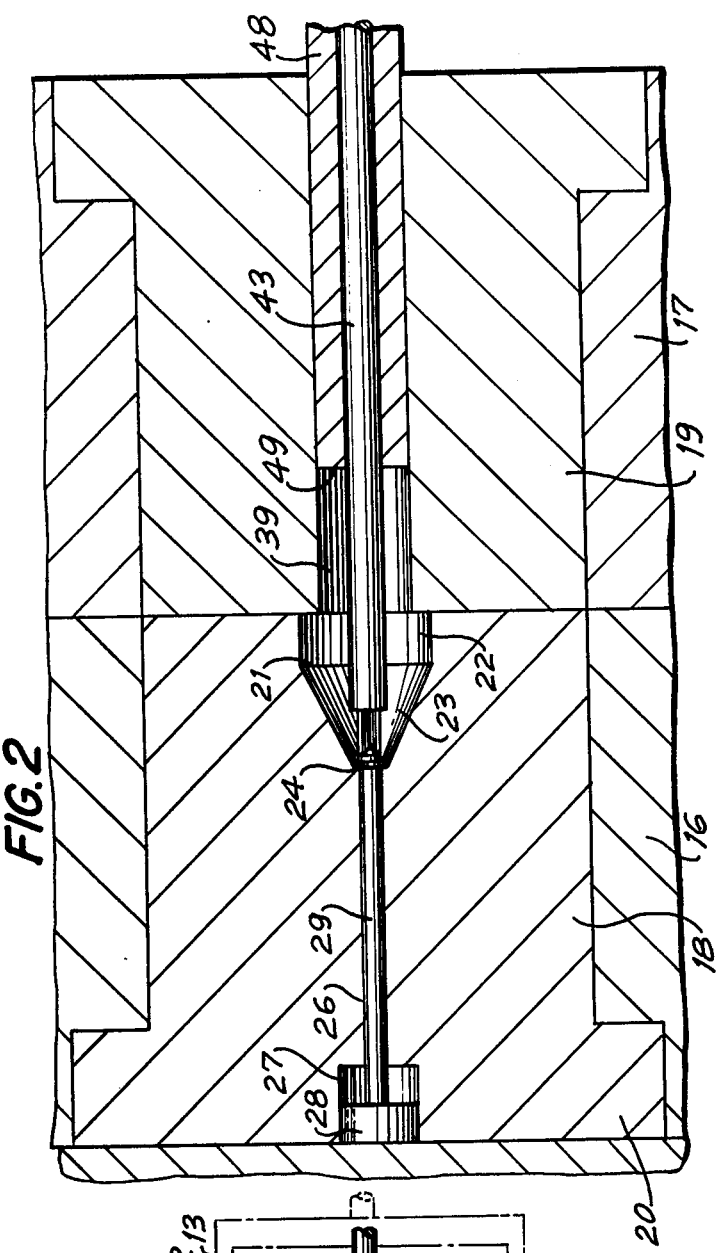
FIG. 2 is an enlarged sectional view taken along line 2—2 in FIG. 1.
Figure 1:
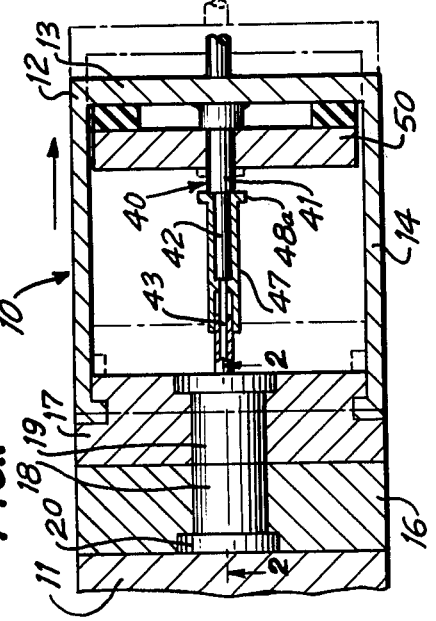
FIG. 1 is a medial longitudinal sectional view of a mold apparatus embodying the present invention shown by full line in the mold closed condition.

Referring now to the drawings which illustrate a preferred embodiment of the present invention, the reference numeral 10 generally designates the improved mold apparatus with which the present method may be practiced, the apparatus 10 being associated with a conventional plastic injection molding machine including a stationary platen 11 and a suitably reciprocatable yoke 12 including a cross piece 13 and longitudinal side arms 14. A front mold block 16 is affixed to the stationary platen 11 and a second mold block 17 is secured to and between the ends of yoke arms 14 and is longitudinally movable therewith, the mold blocks 16 and 17 having confronting parallel faces which coincide when the mold blocks 16 and 17 are in relatively closed abutting position.

One or more front mold members 18 are located in corresponding bores in front mold block 16 and cooperating longitudinally registering rear mold members 19 are located in rear mold block 17 and although only one pair of mold members 18 and 19 are shown it is to be understood that a plurality of these are preferably employed and the mold cavities formed therein communicate in the known manner by suitable runners (not shown) with a sprue in the stationary mold block or platen to effect a coupling to the plastic injection mechanism.

The front mold member 18 is of cylindrical configuration provided with an outwardly projecting rear flange 20 abutting the rear face of stationary platen 11 and fits in a mating bore in block 16. Coaxially formed in the rear face of front mold member 18 is a first or front mold cavity including a short cylindrical rear section 22 joining the base 21 of a forwardly converging conical front section 23 terminating at its front in a flat circular apex or base 24. A longitudinal bore 26 coaxially extends from the cavity base 24 to a radially enlarged cylinder or recess 27 formed in the front face of mold member 18. A piston 28 is axially slidably disposed in the cylinder 27 and is provided with an elongated piston rod 29 slidably engaging the bore 26 and terminating in a flat circular end face 30 which is coplanar with the cavity base 24 when piston 28 and rod 29 are in their forward position and is disposed within conical cavity section 23 when the piston 28 and rod 29 are in their rearward position as limited by the rear face of cylinder 27. Rotation of the piston 28 and piston rod 29 about their axis is prevented by longitudinally slidably engaging groove 25 and rib 25a formed in the confronting peripheral faces of cylinder 27 and piston 28 respectively.

Figure 3:
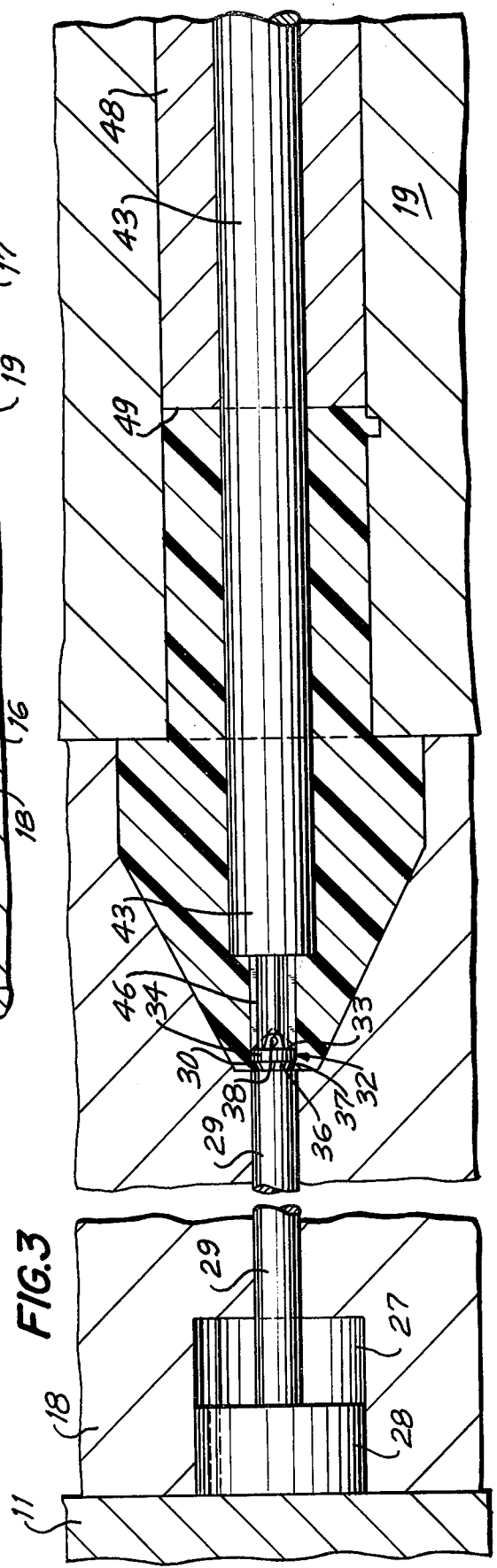
FIG. 3 is an enlarged fragmentary sectional view similar to FIG. 2 showing the closed mold cavity filled with injected thermoplastic resin.
Figure 7:
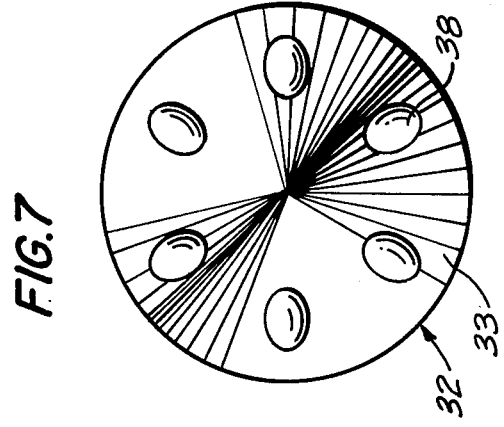
FIG. 7 is an enlarged end view taken along line 7—7 in FIG. 6.
Figure 8:
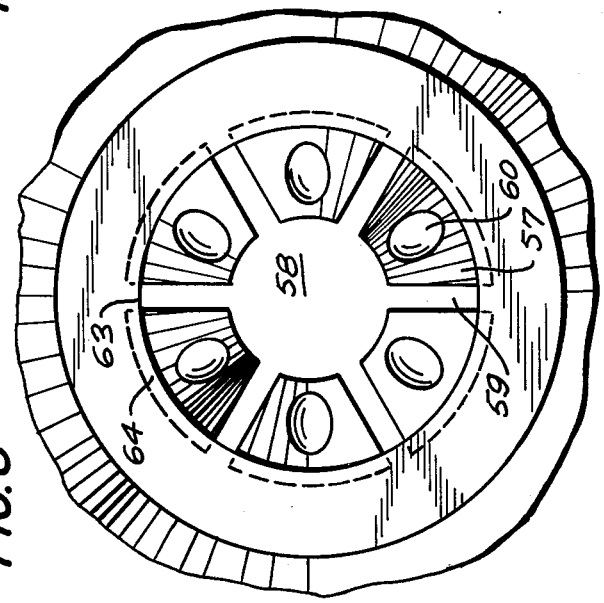
FIG. 8 is an enlarged end view taken along line 8—8 in FIG. 6.
Figure 9:
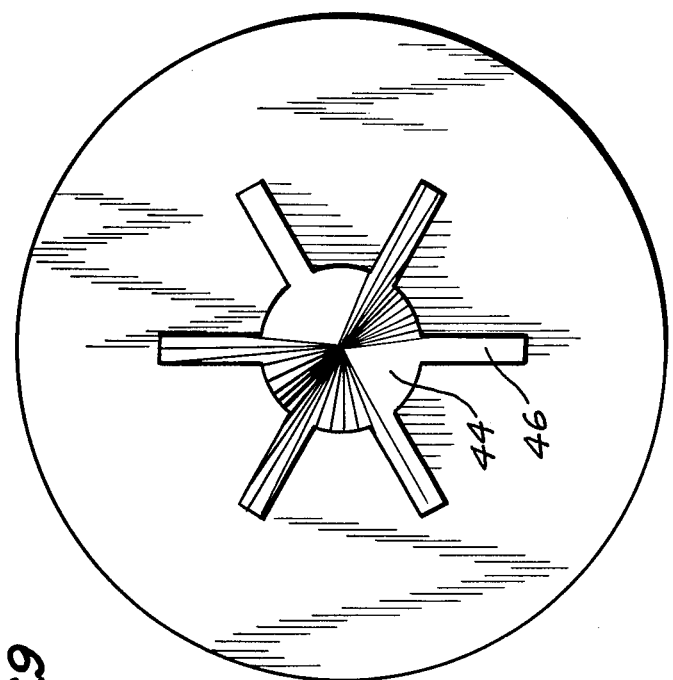
FIG. 9 is an enlarged end view taken along line 9—9 in FIG. 6.
Figure 11:
FIG. 11 is a sectional view taken along line 11—11 in FIG. 10.
Figure 10:
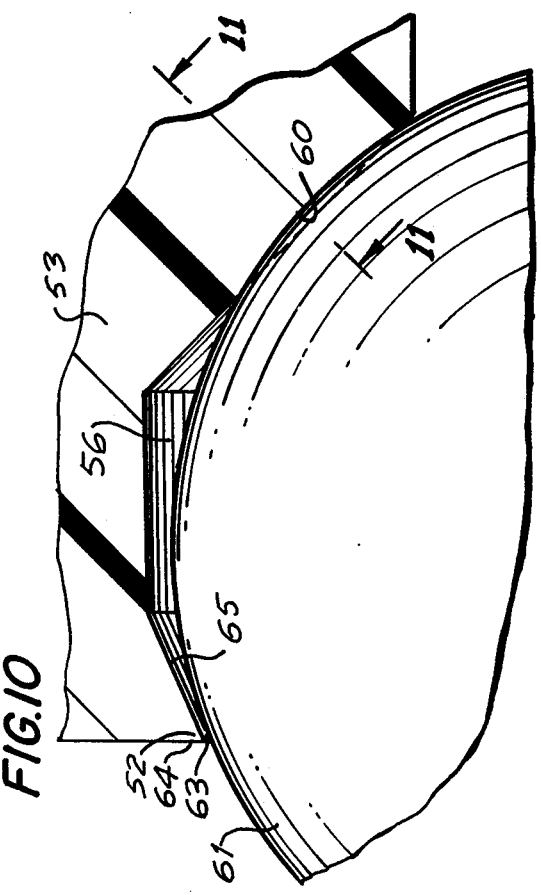
FIG. 10 is a fragmentary enlarged detailed longitudinal sectional view of the assembled ball point nib.

Coaxially located on the rod rear face 30 and integrally formed with piston rod 29 is a first front core member 32 having a rearwardly converging rearwardly directed conical rear face 33 joined at its base to an intermediate cylindrical face 34 which joins the rod rear face 30 by a forwardly converging front frustoconical front forwardly directed face 36. The core member front face 36 and the rod rear face 30 delineate an annular undercut or groove 37 whose front face is coplanar with mold cavity base 24 when the core member 32 is in its retracted position as shown in FIGS. 2 to 4. Integrally formed on core member rear face 33 are a plurality of regularly peripherally spaced protuberances 38 which lie on the surface of a sphere of the diameter of the ink transfer ball.

The rear mold section 19 is of the external configuration of front mold section 18 and is matingly affixed in a corresponding recess in rear mold block 17 coaxial with front mold section 18. A coaxial bore 39 extends through rear mold section 19, the forward part of bore 39 defining the rear section of the mold cavity, and with the front cavity section, the mold cavity. The diameter of bore 39 is less than that of the front cavity rear portion 22.

Affixed to and projecting medially forwardly from yoke cross piece 13 is an elongated stepped near core member 40 including a large diameter rear section 41 and medium diameter intermediate section 42 and a small diameter front section 43 extending coaxially through and forwardly of bore 39, the rear core member 40 being stationary relative to rear mold section 19. The core front section 43 is of lesser diameter than bore 39. Rear core front section terminates in a flat circular front face from which coaxially forwardly projects a central cylindrical core end section 44 provided with radially projecting bars, wings or splines 46 which extend for at least the full length of core end section 44 and terminate in front end faces lying in a conical plane corresponding to front core conical face 33. The front and rear cores 32 and 40 are so positioned and oriented that in the closed condition of the mold the front end faces of rear core radial wings 46 engage the front core conical face 33 and the protuberances 33 are medially disposed in the spaces between successive wings 46.

An ejector member 47 includes a sleeve 48 slidably telescoping bore 39 and in turn slidably telescoped by core rod section 43 and has a front end face 49 which delineates the rear mold cavity rear face when the ejector member is in its retracted position. The sleeve 48 is coupled to a rear sleeve which slidably engages rear core intermediate section 42 and terminates in a rear flange movable into abutment with the front shoulder of rear core section 41. A stationary ejector plate 50 is disposed longitudinally between yoke cross piece 13 and ejector flange 48a, the ejector being so dimensioned and related to the rear mold section 19 that when the mold is in closed condition the ejector front face is inwardly of the front end of bore 39 as shown in FIGS. 2 to 4 and when the mold is in its fully open position the ejector sleeve 48 is advanced to a position where its front face 49 is coplanar with the front face of rear mold section 19, as shown in FIG. 6, by being advanced by the flange 48a bearing against and restrained from retraction by the stationary ejector plate 50.

In producing a ball point nib in accordance with the method of the present application employing the improved molding apparatus 10 described above, the injection molding apparatus is actuated to close the front and rear mold sections 18 and 19 and retract the ejector sleeve 48 to the positions shown in FIG. 2, the front and rear core members being in end-to-end engagement with the front end faces of rear core wings 46 and the concave conical front face of core cylindrical section 44 engaging front core rear conical face 33 and protuberances 38 interdigitating wings 46. A synthetic organic thermoplastic polymeric resin which is resilient or possesses a shape-returning memory such as nylon, for example Delvin 500, is injected in a molten state in the known manner through suitably located runners to fill the closed mold cavity, as shown in FIG. 3, and the resin in the cavity is permitted to solidify to form the nib body member 51. The rear mold section is then retracted, as shown in FIG. 4, to partially withdraw the molded body 51 from the front mold cavity drawing the front core therewith to a position where the piston 27 engages the rear face of cylinder 28. Further retraction of the rear mold section spreads or expands the lip 52 by the camming action of core front face 36 to permit the separation or stripping of the lip 52 from undercut 37 and its rear passage out of engagement with front core 32 and its return to its initial unstressed position. Further retraction of the rear mold section effects the relative advance of the ejector sleeve 48 to its forward molded piece ejecting position as shown in FIG. 6 to complete the production of the nib body member 51.

The molded body member 51 includes an enlarged front section 53 and a coaxial cylindrical tubular rear section 54. Formed in the front section is a transfer ball housing cavity 56 having a conically shaped annular rear seat 57 surrounding a central bore 58 which extends rearwardly through the nib rear section 54. The seat 57 is divided into equal sector shaped sections by the ends of longitudinally extending capillary passageways 59 projecting radially from and communicating with bore 58. Centrally formed in each of the seat sections is a hollow concavity 60 whose faces lie in the surface of a sphere whose diameter is that of the ink transfer ball 61.

A circular front opening 63 is coaxially formed in the front of the body member 51 and provides communication with the body cavity 56, the diameter of opening 63 being slightly less than that of ball 61. The opening 63 is surrounded by the deformable shape retaining or flexible lip 52 which includes a flat planar front face 64 and a rearwardly outwardly inclined rear face 65 diverging rearwardly from the front edge of opening 63.

In assembling the ink transfer ball 61 and the nib body member 51 the ball 61 is applied to and pressed through the body front opening 63 the face of the ball 61 camming and pressing outwardly against the inner edge of lip 52 to urge it outwardly and expand the opening 63 to permit the passage of the ball 61 through the expanded opening 63 into cavity 56 and into rolling engagement with the seat concavities 60. Following the passage of the ball 61 through front opening 63 the lip returns to its initial dimensions returning the opening to a diameter less than that of ball 61 to thereby retain the ball in a freely rotatable condition in nib body cavity 56. Any suitable tool or mechanism may be employed for inserting the ball 61 through the opening 63 in the above manner.

While there has been described and illustrated a preferred embodiment of the present invention, it is apparent that numerous alterations, additions and omissions may be made without departing from the spirit thereof.

I claim:

1. The method of producing a ball point nib comprising injection molding of a thermoplastic synthetic organic polymeric resin, an integral nib body member having a cavity for housing an ink transfer ball and provided with a central front opening surrounded by an inwardly directed temporarily pressure deformable annular lip and a passageway providing communication between said cavity and the rear of said body member and pressing an ink transfer ball of a diameter greater than the width of said front opening and not exceeding the width of said cavity through said opening into said cavity by expanding said opening under the influence of said ball pressed against said lip to permit the passage of said ball through said opening into said cavity, said body member being produced by injecting the resin in a molten state into a mold having front and rear sections, said front section having a first mold cavity therein and an axial first core member located in said first mold cavity and having an annular undercut complementing said lip and being axially movable in a limited path between a forward position with said undercut being proximate the forward base of said first mold cavity and a rear position rearwardly of said forward position, permitting said molten resin to solidify in said mold, separating said front and rear mold sections to first withdraw the solidified body member from said first mold cavity and retract the core member to its rear position and further separating the mold sections to withdraw said core member out of engagement with said molded body member, said front annular lip delineated by said undercut returnably expanding consequent to the withdrawal of said core member from said solidified body member.

2. The method of claim 1 wherein said front and rear mold sections are stationary and longitudinally movable respectively and an ejector member carried by said rear mold section and communicating with a second mold cavity therein advances through said second mold cavity with the separation of the front and rear mold sections.

3. The method of claim 1 wherein said rear mold section includes a second mold cavity confronting said first mold cavity and a second core member coaxial with the first core member and engaging the first core member in the mold closed condition.

4. The method of claim 3 wherein said first core member includes a conical rear face and said second core member includes peripherally spaced forwardly projection bars terminating in forward faces coinciding with a conical surface complimenting said conical rear face.

5. The method of claim 4 wherein said conical rear face has peripherally spaced protuberances registering with the spaces between said forwardly projecting bars and said first core member is prevented from rotating about its longitudinal axis.

6. The method of producing a ball point nib comprising injection molding of a thermoplastic synthetic organic polymeric resin, an integral nib body member having a cavity for housing an ink transfer ball and provided with a central front opening surrounded by an inwardly directed temporarily pressure deformable annular lip and an elongated passageway providing communication between said cavity and the rear of said body member, said injection molding being effected by injecting the resin in a molten state into a mold cavity having located therein an axial core member provided with an annular undercut complementing said lip and including a substantially flat annular front face and a substantially conical rear face and pressing an ink transfer ball of a diameter greater than the width of said front opening and not exceeding the width of said cavity through said opening into said cavity by expanding said opening under the influence of said ball pressed against said lip to permit the passage of said ball through said opening into said cavity.

* * * * *